(12) United States Patent
Hall (10) Patent No.: US 7,549,026 B2
(45) Date of Patent: Jun. 16, 2009

(54) METHOD AND APPARATUS TO PROVIDE DYNAMIC HARDWARE SIGNAL ALLOCATION IN A PROCESSOR

(75) Inventor: Christopher S. M. Hall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 11/094,029

(22) Filed: Mar. 30, 2005

(65) Prior Publication Data

US 2006/0253660 A1     Nov. 9, 2006

(51) Int. Cl.
*G06F 13/00*     (2006.01)
(52) U.S. Cl. ........................................ 711/154; 711/156
(58) Field of Classification Search ................ 711/154, 711/156
See application file for complete search history.

(56) References Cited

U.S. PATENT DOCUMENTS

| | | | |
|---|---|---|---|
| 6,104,721 A * | 8/2000 | Hsu | 370/431 |
| 2002/0147943 A1* | 10/2002 | Slaugh et al. | 714/39 |
| 2006/0059286 A1* | 3/2006 | Bertone et al. | 710/260 |

OTHER PUBLICATIONS

"Look-Aside (LA-1) Interface Implementation Agreement", *The Network Processing Forum*, (Apr. 15, 2004), 22 pages.

* cited by examiner

*Primary Examiner*—Mardochee Chery
(74) *Attorney, Agent, or Firm*—Daly, Crowley, Mofford & Durkee, LLP (57) ABSTRACT

In a processor having hardware event signals, signals are dynamically allocated in a mask to indicate whether each of the respective signals is available. Program code can use the same signal for multiple non-concurrent operations. A tag for an operation, such as an I/O operation can provide signal virtualization. In one embodiment, the tag includes a signal pending mask and a received signal mask. A comparison the mask can identify when an operation is complete.

20 Claims, 12 Drawing Sheets

METHOD AND APPARATUS TO PROVIDE DYNAMIC HARDWARE SIGNAL ALLOCATION IN A PROCESSOR

CROSS REFERENCE TO RELATED APPLICATIONS

Not Applicable.

STATEMENT REGARDING FEDERALLY SPONSORED RESEARCH

Not Applicable.

BACKGROUND

As is known in the art, network processors can be used to pass data traffic to various networks over different network interfaces. In general, network processors are optimized to process packets at high speeds. Network processors typically include multiple programmable packet-processing engines or elements running in parallel with mechanisms for the processing engines to communicate with each other. Network processors can include a general purpose microprocessor to handle control tasks and memory controllers to facilitate movement of packets in and out of memory. Network processors further include interface modules for one or more standardized interfaces. Additional network processor modules can include coprocessors for accelerating various functions, such as encryption and decryption. Some network processors, such as the IXP family of network processors by Intel Corporation, have multiple cores on a single die. Communication between the IXP cores is accomplished through hardware-supported queuing mechanisms implemented in the memory controller(s).

Network processors can be coupled to various types of memory, such as Static Random Access Memory (SRAM), which is relatively fast and expensive, and Dynamic Random Access Memory (DRAM), which is relatively slow, dense, and inexpensive. SRAM and DRAM accesses have different signaling requirements. Accesses to SRAM require a single signal number to indicate completion of an operation, e.g., read or write. For some processor/memory implementations, DRAM accesses require two signals to indicate completion of an operation. Only after both DRAM signals have been generated is the operation guaranteed to have finished.

As is well known in the art, microcode is used to program the processing elements of the network processor. The microcode utilizes hardware signals supported by the processor that can, for example, indicate completion of various asynchronous operations. A processor has a predetermined number of hardware signals that can be used when programming the processing elements to notify threads of specific events. Microcode must generally be written such that no one signal is used concurrently by more than one Input/Output (I/O) operation in order to guarantee code correctness. In addition, microcode is usually written such that each operation receives a statically assigned signal. While static signal allocation prevents concurrent use of a signal, the total number of possible operations available to any microcode thread is limited. On some Intel IXP network processors, for example, fifteen signals are available per thread. This limits the number of memory accesses to fifteen total SRAM operations or seven total DRAM operations (DRAM requires two signals) using static signal allocation. For example, using static signal allocation where fifteen signals are supported in hardware, it would not be possible to code two separate DRAM reads, two separate SRAM reads, two separate DRAM writes, two separate SRAM writes, and four separate SRAM dequeue operations.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
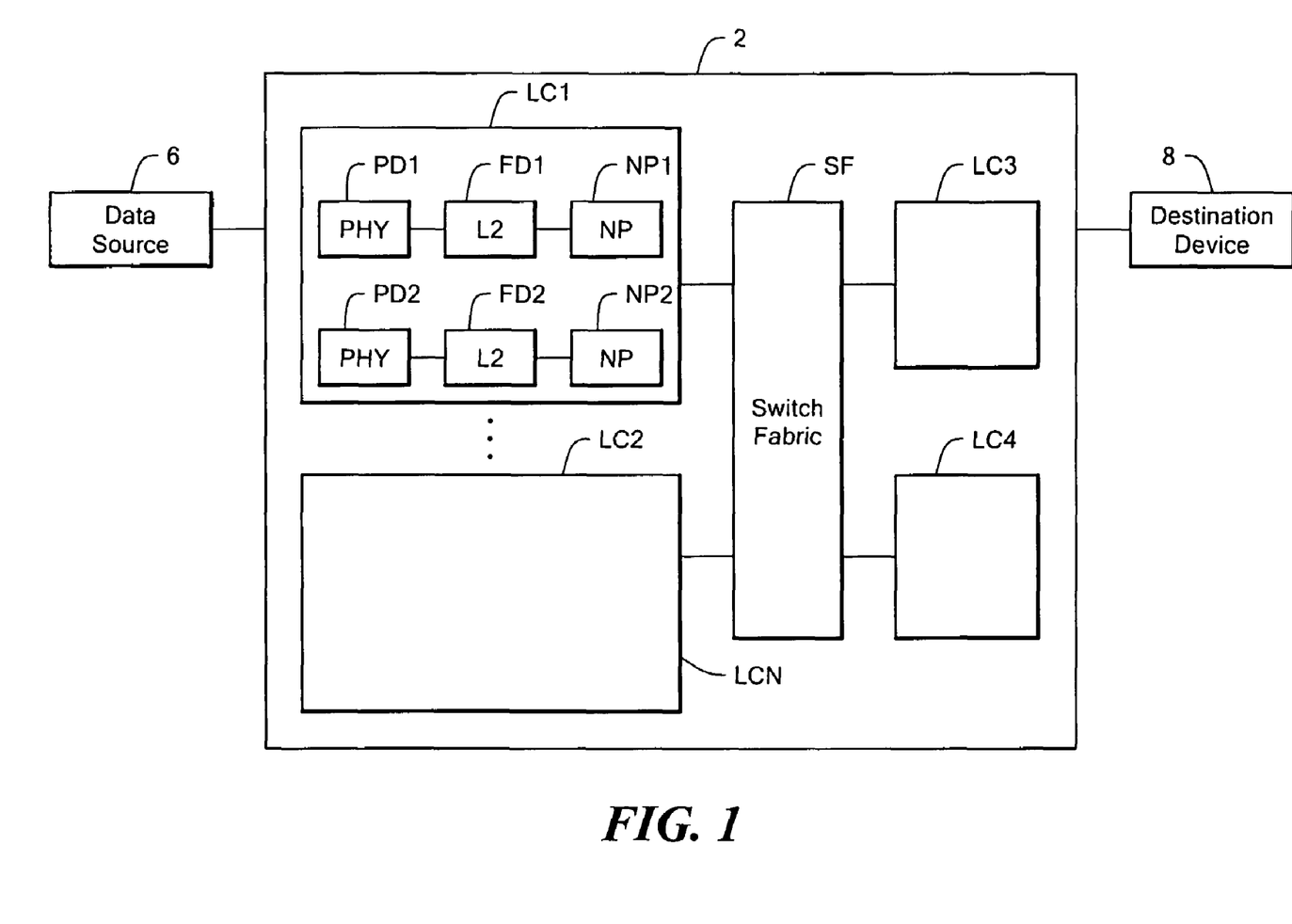
FIG. 1 is a diagram of an exemplary system including a network device having a network processor unit with dynamic signal allocation.

FIG. 1 shows an exemplary network device 2 having network processor units (NPUs) that can be programmed to provide dynamic processor signal allocation. Signals are used by processing elements (FIGS. 2 and 3) in the NPUs to notify threads of specific events. That is, a hardware signal is generated, e.g., a bit is set in a register, when a request made by a processing core in a multi-core device is completed, where the request is external, such as to another processing core, to the first processing core. Code running a network processor, for example, can execute in multiple threads in multiple processing cores when processing a packet. The device 2 processes incoming packets from a data source 6 and transmits the processed data to a destination device 8. The network device 2 can include, for example, a router, a switch, and the like. The data source 6 and destination device 8 can include various network devices now known, or yet to be developed, that can be connected over a communication path, such as an optical path having an OC-192 line speed.

The illustrated network device 2 can dynamically allocate hardware signals as described in detail below. The device 2 features a collection of line cards LC1-LC4 ("blades") interconnected by a switch fabric SF (e.g., a crossbar or shared memory switch fabric). The switch fabric SF, for example, may conform to CSIX (Common Switch Interface) or other fabric technologies such as HyperTransport, Infiniband, PCI (Peripheral Component Interconnect), Packet-Over-SONET (Synchronous Optic Network), RapidIO, and/or UTOPIA (Universal Test and Operations PHY Interface for ATM (Asynchronous Transfer Mode)).

Individual line cards (e.g., LC1) may include one or more physical layer (PHY) devices PD1, PD2 (e.g., optic, wire, and wireless PHYs) that handle communication over network connections. The PHYs PD translate between the physical signals carried by different network mediums and the bits (e.g., "0"-s and "1"-s) used by digital systems. The line cards LC may also include framer devices (e.g., Ethernet, Synchronous Optic Network (SONET), High-Level Data Link (HDLC) framers or other "layer 2" devices) FD1, FD2 that can perform operations on frames such as error detection and/or correction. The line cards LC shown may also include one or more network processors NP1, NP2 that perform packet processing operations for packets received via the PHY(s) and direct the packets, via the switch fabric SF, to a line card LC providing an egress interface to forward the packet. Potentially, the network processor(s) NP may perform "layer 2" duties instead of the framer devices FD.

Figure 2:
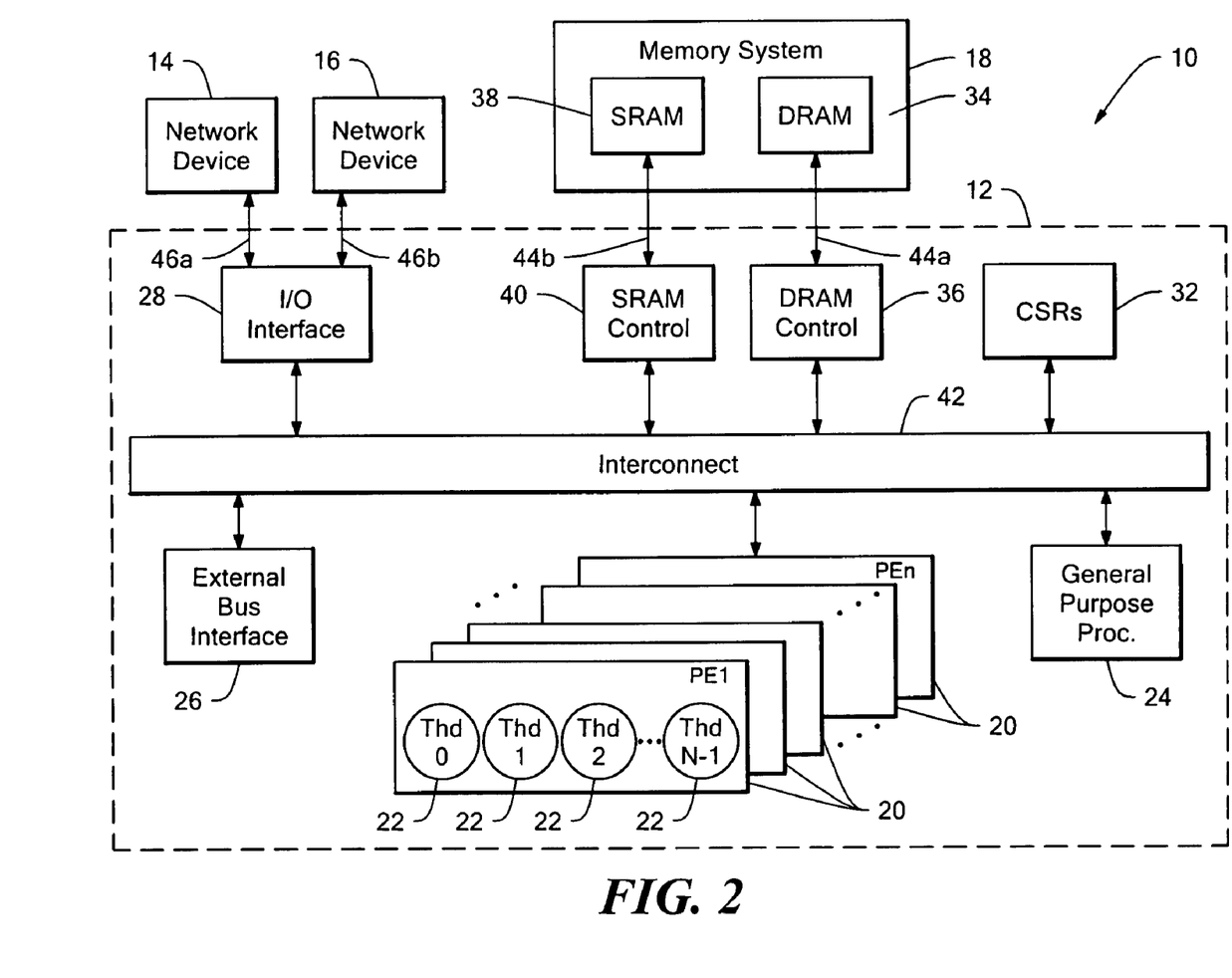
FIG. 2 is a diagram of an exemplary network processor having processing elements providing dynamic signal allocation.

FIG. 2 shows an exemplary system 10 including a processor 12, which can be provided as a network processor having multiple cores on a single die. The processor 12 is coupled to one or more I/O devices, for example, network devices 14 and 16, as well as a memory system 18. The processor 12 includes multiple processors ("processing elements" or "PEs") 20, each with multiple hardware controlled execution threads 22. In the example shown, there are "n" processing elements 20, and each of the processing elements 20 is capable of processing multiple threads 22. Each of the processing elements 20 is connected to and can communicate with adjacent processing elements.

In one embodiment, the processor 12 also includes a general-purpose processor 24 that assists in loading microcode control for the processing elements 20 and other resources of the processor 12 and performs other computer type functions such as handling protocols and exceptions. In network processing applications, the processor 24 can also provide support for higher layer network processing tasks not handled by the processing elements 20.

The processing elements 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, such as payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC (Media Access Control) devices, e.g., for connecting to 10/100BaseT Ethernet, Gigabit Ethernet, ATM (Asynchronous Transfer Mode) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and other data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 3:
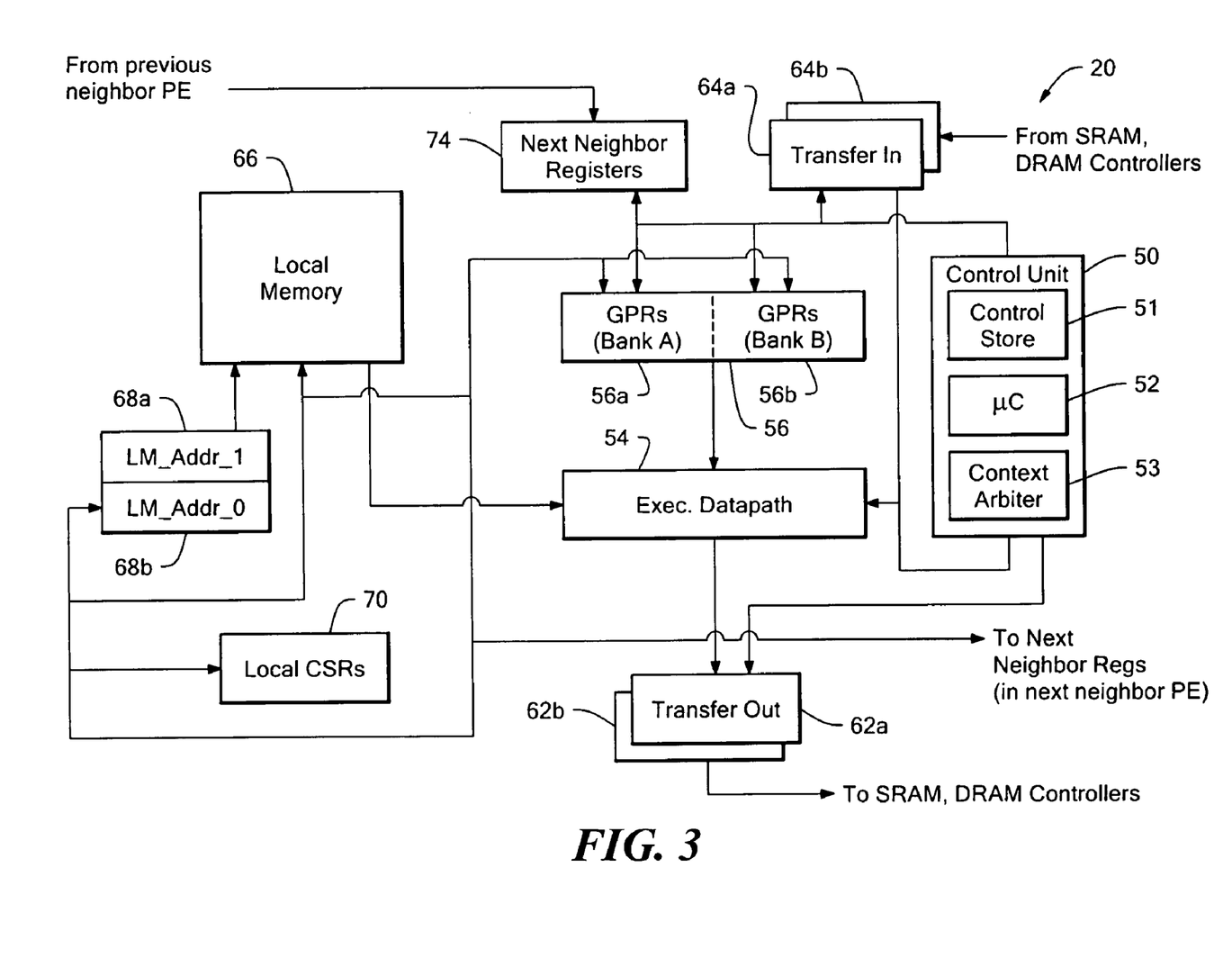
FIG. 3 is a diagram of an exemplary processing element (PE) that runs microcode.

Referring to FIG. 3, an exemplary one of the processing elements 20 is shown. The processing element (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing element's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written under program control. The GPRs, when used as a source in an instruction, supply operands to the datapath 54. When used as a destination in an instruction, the GPRs are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing element. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the processing element 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68a ("LM_Addr_1"), 68b ("LM_Addr_0"), which supplies operands to the datapath 54, and receives results from the datapath 54 as a destination.

The PE 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the processing element as well.

Other register types of the PE 20 include next neighbor (NN) registers 74, coupled to the control store 50 and the execution datapath 54, for storing information received from a previous neighbor PE ("upstream PE") in pipeline processing.

While illustrative hardware is shown and described herein in some detail, it is understood that the exemplary embodiments shown and described herein for dynamic signal allocation are applicable to a variety of hardware, processors, architectures, devices, development systems/tools and the like.

Figure 4:
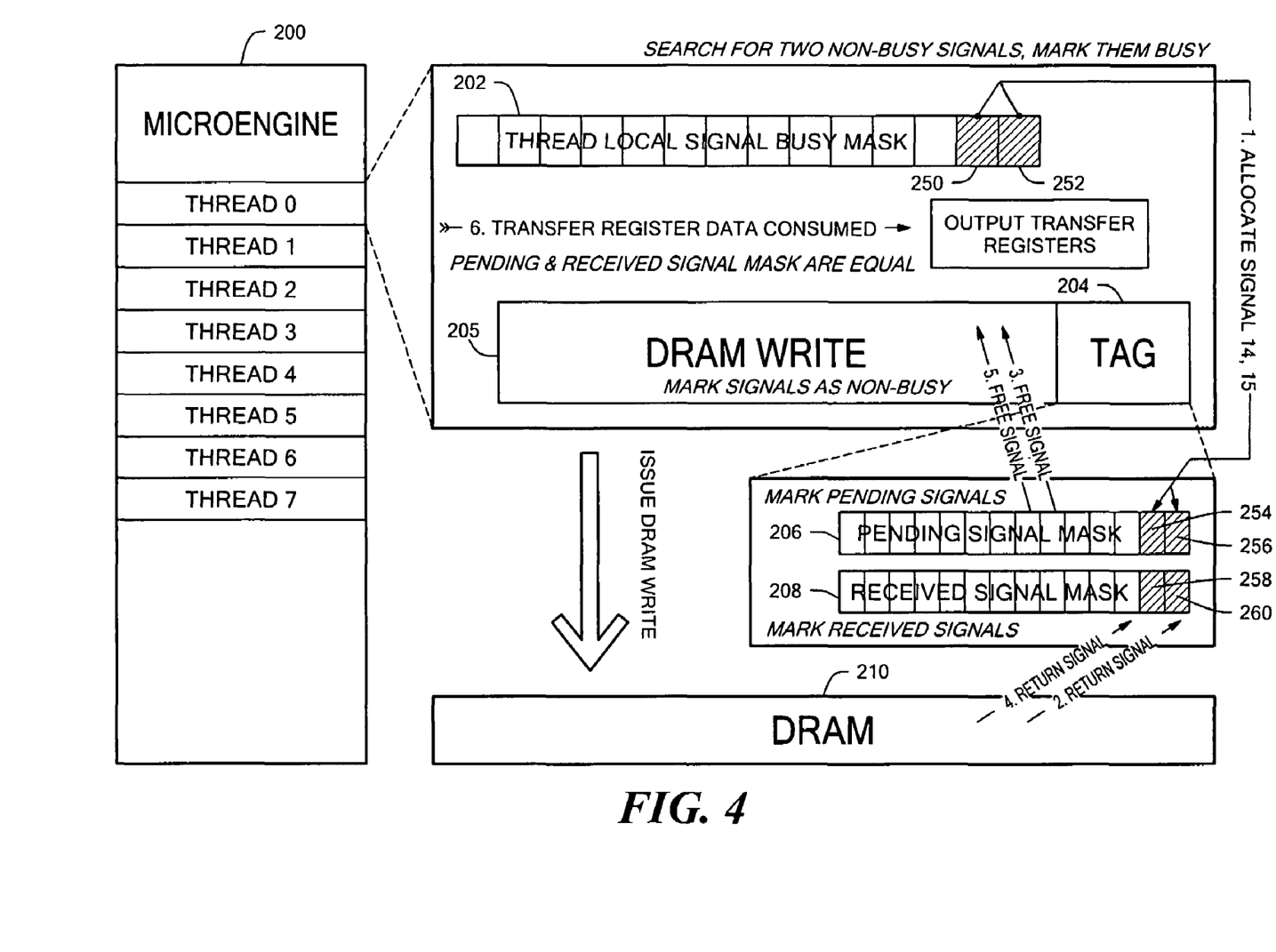
FIG. 4 is a pictorial representation of dynamic signal allocation.

FIG. 4 shows an exemplary embodiment of dynamic signal allocation. A processing element 200 includes a number of threads TH0-TH7, here shown as eight threads. A first thread TH0 includes a signal busy mask 202 and a DRAM write tag 204. In one embodiment, the contents of the signal busy mask 202 are local to the first thread TH0. A DRAM write block 205 contains program code that requests memory from DRAM. In an exemplary embodiment, the DRAM write block 205 includes a register location, a memory location, a transfer count, and signal(s) to be used. The DRAM write block 205 can also contain program code that updates the tags as signals are sent by the hardware and causes execution of the code that is waiting for the completion of any particular operation. Operation specific code is associated with a particular tag.

The signal busy mask 202 can be provided in the GPRs of the processing element 200 or local memory. In general, the GPRs can be addressed as context-relative (each thread gets its own physical copy of the GPR) and absolute (a single copy of the GPR is shared by all threads) modes. In the illustrated embodiment, the signal busy mask 202 is local to the thread, i.e., context-relative addressed. It will be appreciated that further storage locations for the signal busy mask are possible without departing from the exemplary embodiments described herein.

In one embodiment, each bit in the thread local signal busy mask 202 corresponds to one hardware signal. For example, if the processing element has sixteen signals, the signal busy mask contains sixteen bits. At initialization, each of these bits is cleared to indicate that all signals are available.

A particular hardware signal is allocated by searching the signal busy mask 202 for a signal whose status bit is clear (available) and setting that bit in order to indicate that the signal is now unavailable. The signal can be used for an I/O operation or other function. Once assertion of a signal is detected, its corresponding status bit in the signal busy mask 202 is again cleared indicating that it is available for use by another I/O operation.

With this arrangement, signals can be dynamically allocated. Bits in the signal busy mask 202 are clear when the corresponding signal is available and set when the corresponding signal is in use. While program code, e.g., microcode, is limited to the maximum number of signals supported by the processor that can be used at any one time, the program code can reference hardware signals an unlimited number of times as long as concurrent use of the signals is equal to or less than the maximum number of signals.

In another aspect of the exemplary embodiments, to provide what can be referred to as signal virtualization, a tag 204 can be attached to various operations, such as I/O operations. The tag 204 can be provided in GPRs, local memory, or other storage location. The tag 204 includes a pending signal mask 206 and a received signal mask 208, each of which contains one bit for each hardware signal in an exemplary embodiment. The pending signal mask 206 indicates which signals are pending and the received signal mask 208 indicates which signals have already been received. As hardware signals are asserted and consumed, the received signal mask 208 is updated. The received and pending signal masks 206, 208 are compared to determine if the operation is complete. In one embodiment, when the received and pending signal masks 206, 208 are equal, the operation is deemed complete. After a signal has been consumed and freed, it can be re-allocated for use in other I/O operations.

An exemplary DRAM write operation uses dynamic signal allocation and virtualization. Two consecutive signals are allocated by setting corresponding bits 250,252 in the thread local signal busy mask 202 for the DRAM write operation. As noted above, two signals are needed for DRAM access operations. The signals are allocated by searching the thread local signal busy mask 202 and identifying two consecutive cleared bits, indicating available signals. In other embodiments, consecutive or non-consecutive bits can be used.

A write tag 204 having a pending signal mask 206 and a received signal mask 208 are 'attached' to the DRAM write operation. First and second bits 254, 256 are set in the pending signal mask 206 to indicate allocation for use by the write operation. The received signal mask bits 208 are cleared.

A DRAM write command is issued by the processing element 200 specifying the use of the first and second hardware signals that correspond to the bits allocated in the thread local signal busy mask 202. After both the first and second signals have been asserted, the write data in the transfer registers has been pulled.

As the assertion of the two hardware signals for the write operation is detected by the first thread TH0, the corresponding two bits 258, 260 are set in the received signal mask 206. Since the pending and received signal masks 206, 208 are then equal, the operation is considered complete. The corresponding bits 250, 252 are cleared in the signal busy mask 202 to indicate that the signals available. The bits in the pending and received signal masks 206, 208 are then reset.

Figure 5:
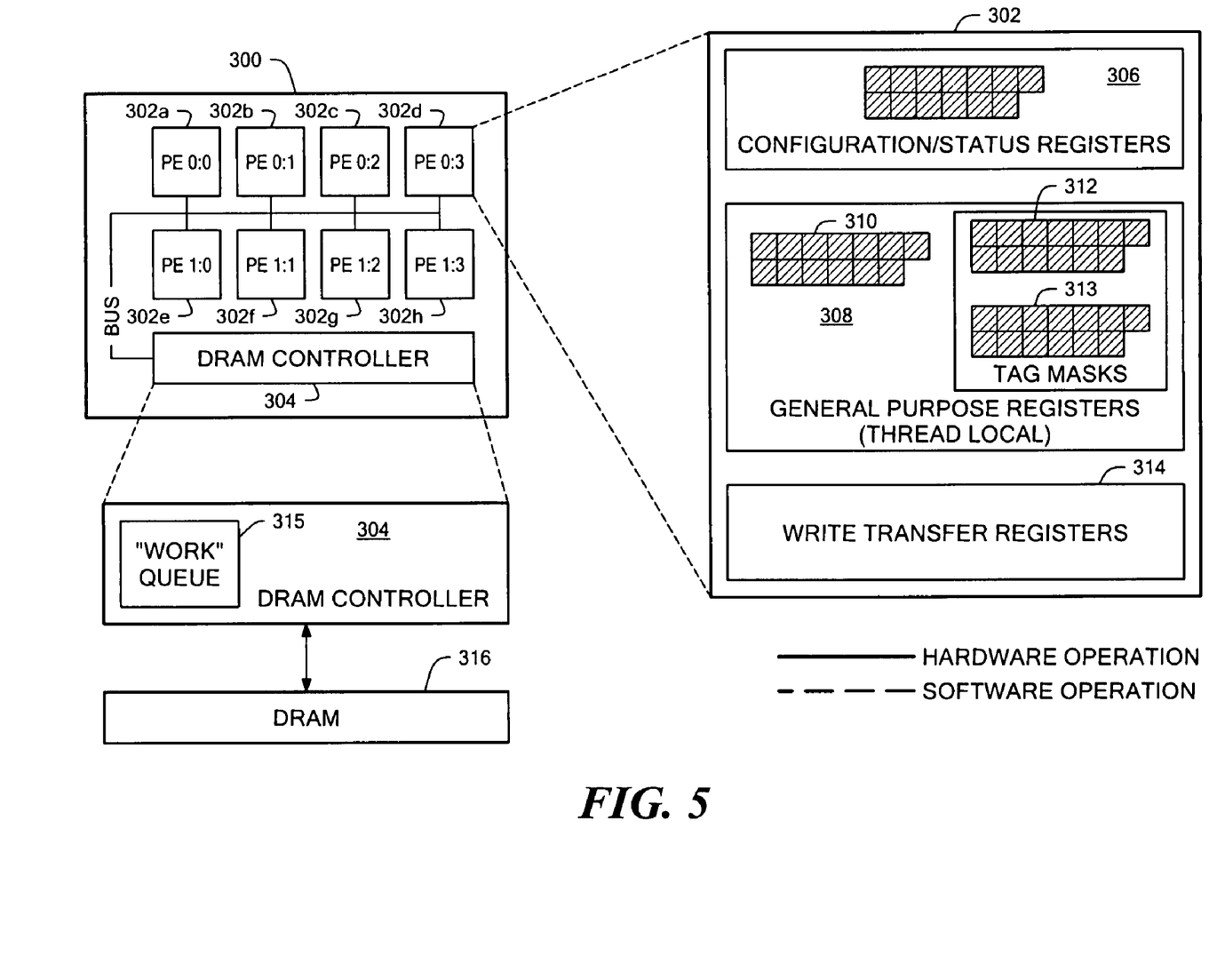
FIG. 5 is a schematic depiction of dynamic signal allocation and signal virtualization.

FIG. 5 shows a network processor 300 providing dynamic signal allocation and signal virtualization. FIGS. 5A-G show sequential interaction in hardware and software for a write to DRAM. The network processor 300 includes a number of processing elements (PE) 302a-h and a DRAM controller 304. A first processing element 302 of the network processor is shown having CSRs 306 and GPRs 308, which can be local to the thread. Some of the GPRs 308, such as GPR 310, can be used as a signal busy mask (as shown in FIG. 4) having a number of bits each providing availability status for a particular hardware signal. Some of the GPRs 308, such as GPRs 312 and 313, are selected to provide tag masks (as shown in FIG. 4) for I/O operations, such as a DRAM write. The processing element 302 also includes a write transfer register 314.

The DRAM controller 304, which is shown exploded from the network processor 300, interacts with external DRAM 316. The DRAM controller 304 pulls write data from the write transfer register 314. The DRAM controller 304 includes a 'work' queue 315 for storing data prior to accessing the DRAM 316. It is understood that a wide variety of memories can be used of which Samsung DDR-SDRAM having part number PC2700U-25330-B1 is but one example.

Figure 5A:
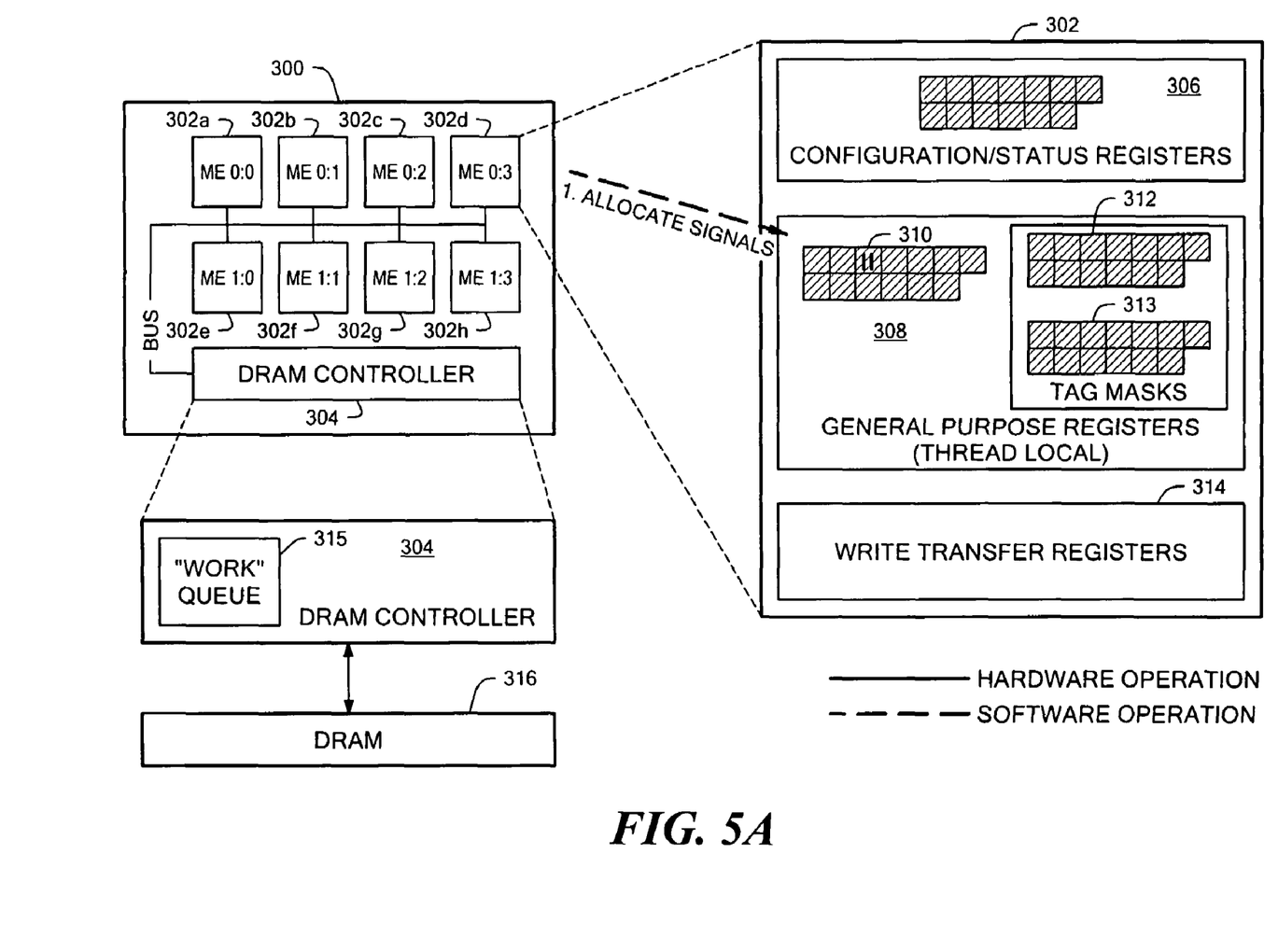
FIGS. 5A-5G show exemplary processing stages of dynamic signal allocation and virtualization.

As shown in FIG. 5A, hardware signals are allocated in the signal busy mask 310 for a given I/O operation in a given GPR for the processing element. As noted above, two signals are allocated for a DRAM write. Accordingly, first and second bits are set in the signal busy mask 310, as shown in FIG. 4.

Figure 5B:
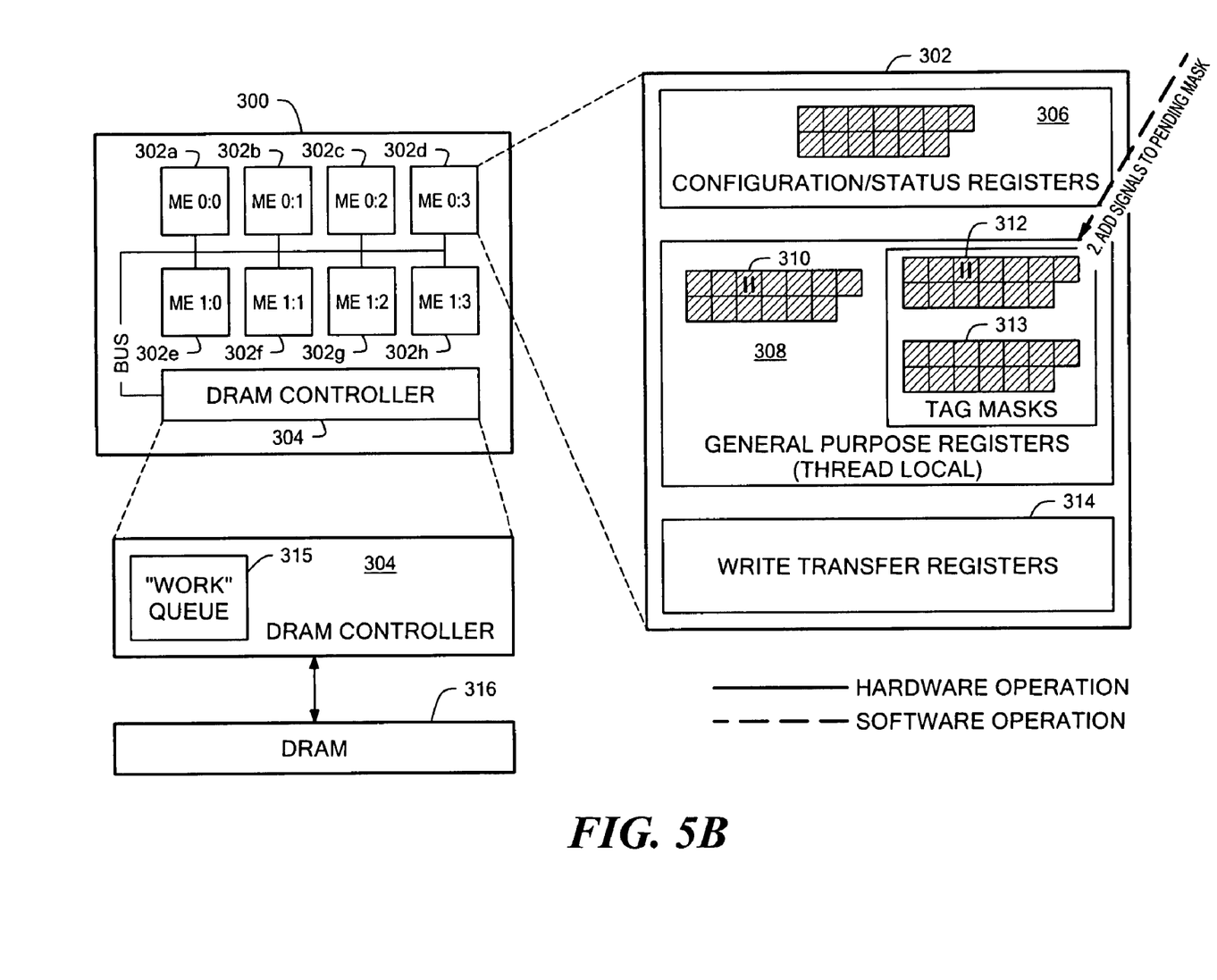

As part of a tag for the I/O operation, as shown in FIG. 5B a pending signal mask is implemented in a further GPR 312 and a receive signal mask is implemented in another GPR 313. As described above, the pending signal mask 312 and received signal mask 313 provide the tag for the DRAM access. The pending signal mask 312 is updated to set two bits, one for each allocated hardware signal.

Figure 5C:
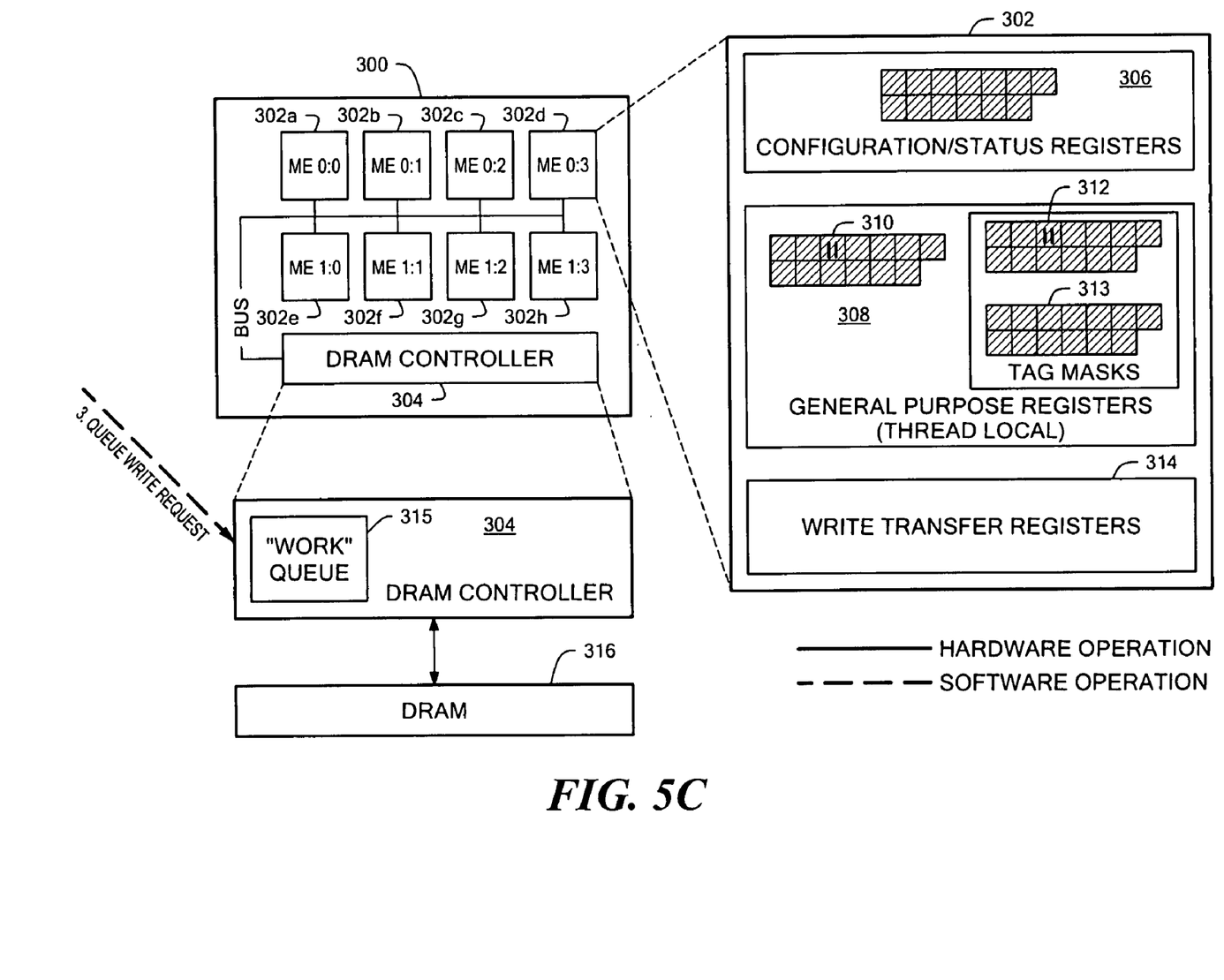
Figure 5D:
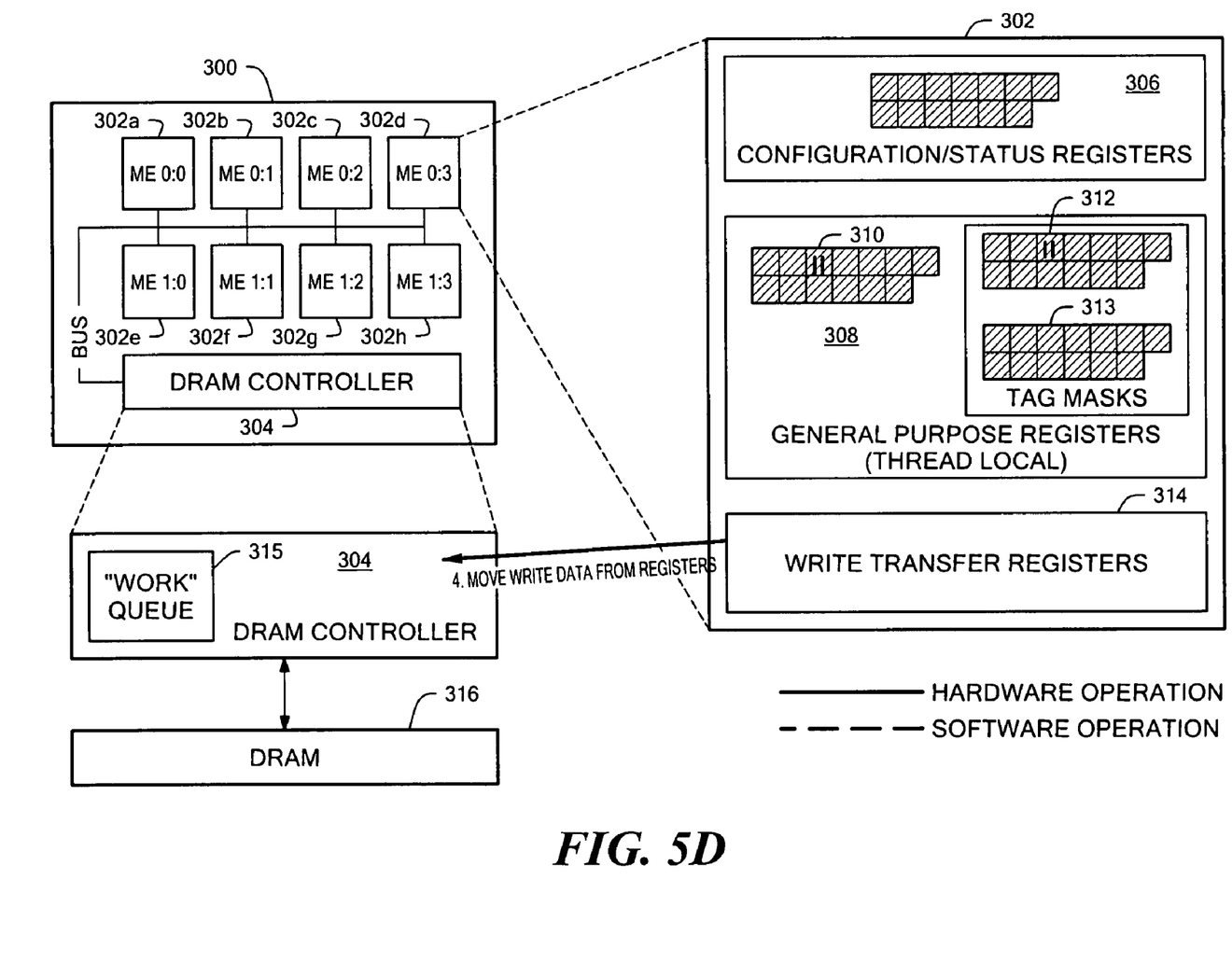

As shown in FIG. 5C, the current processing thread places a write request in a work queue 315 in the DRAM controller 304. The data in the write transfer register 314 is then pulled to the DRAM controller 304 as shown in FIG. 5D. Note that the data transfer operation is a hardware operation.

Figure 5E:
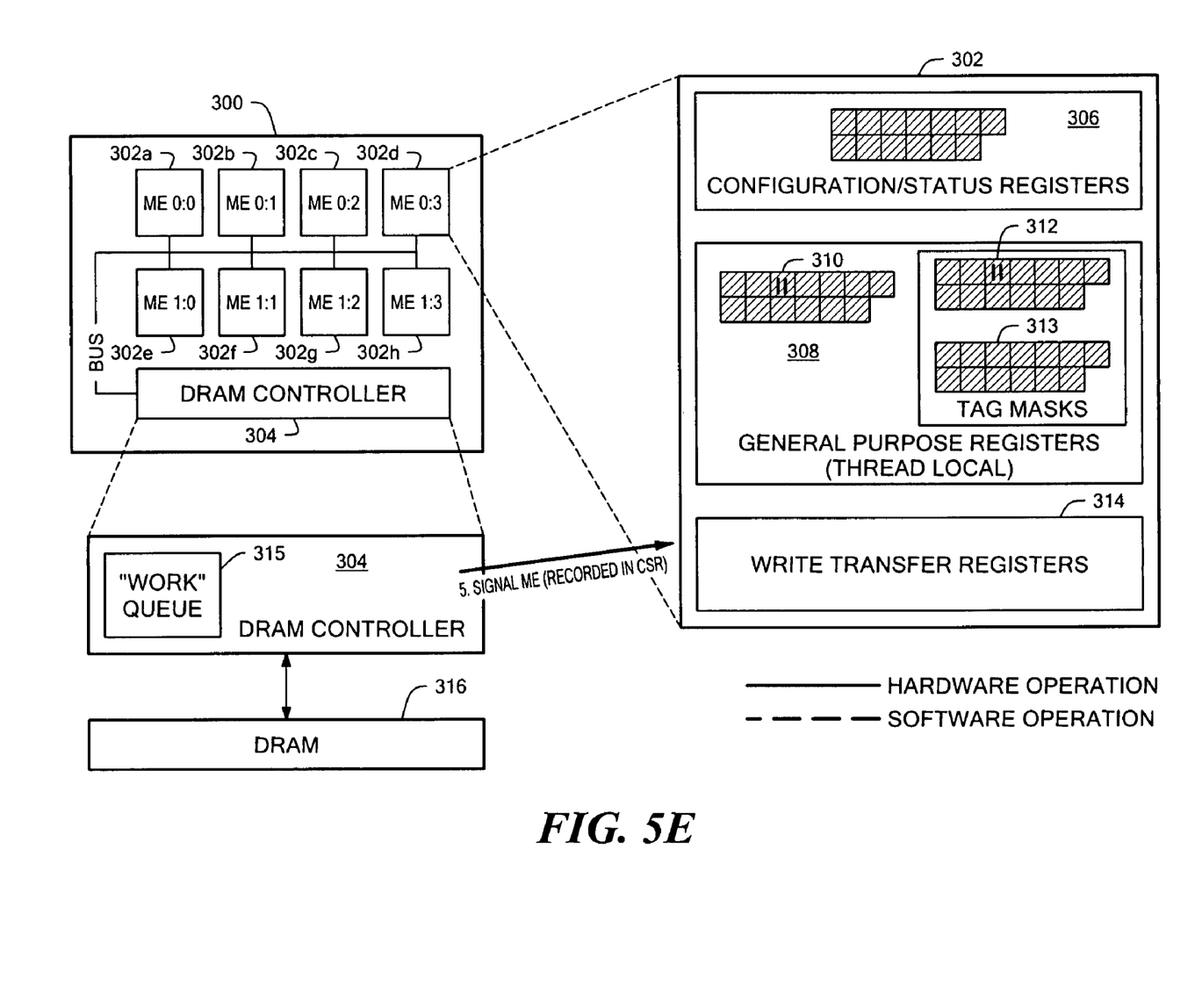
Figure 5F:
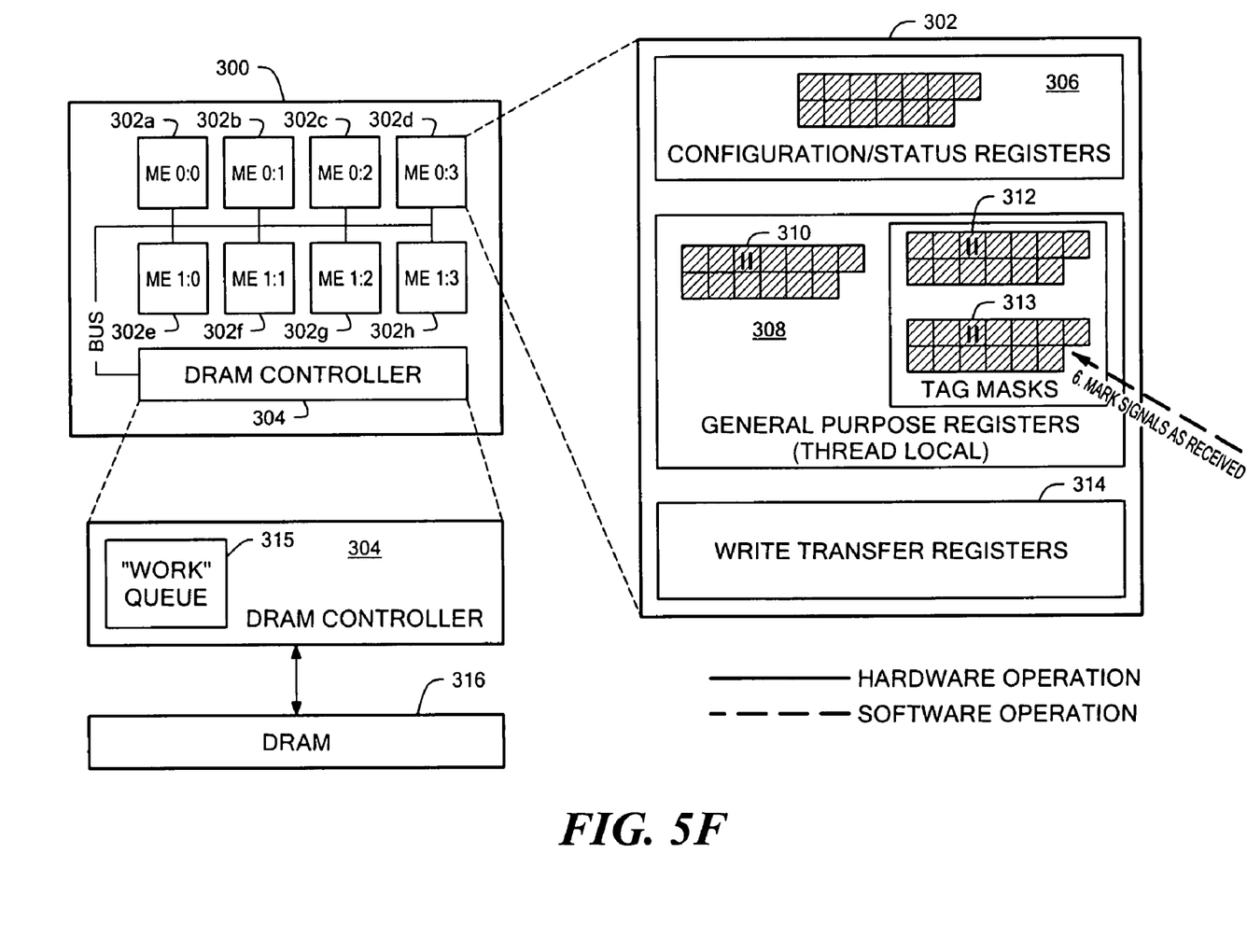
Figure 5G:
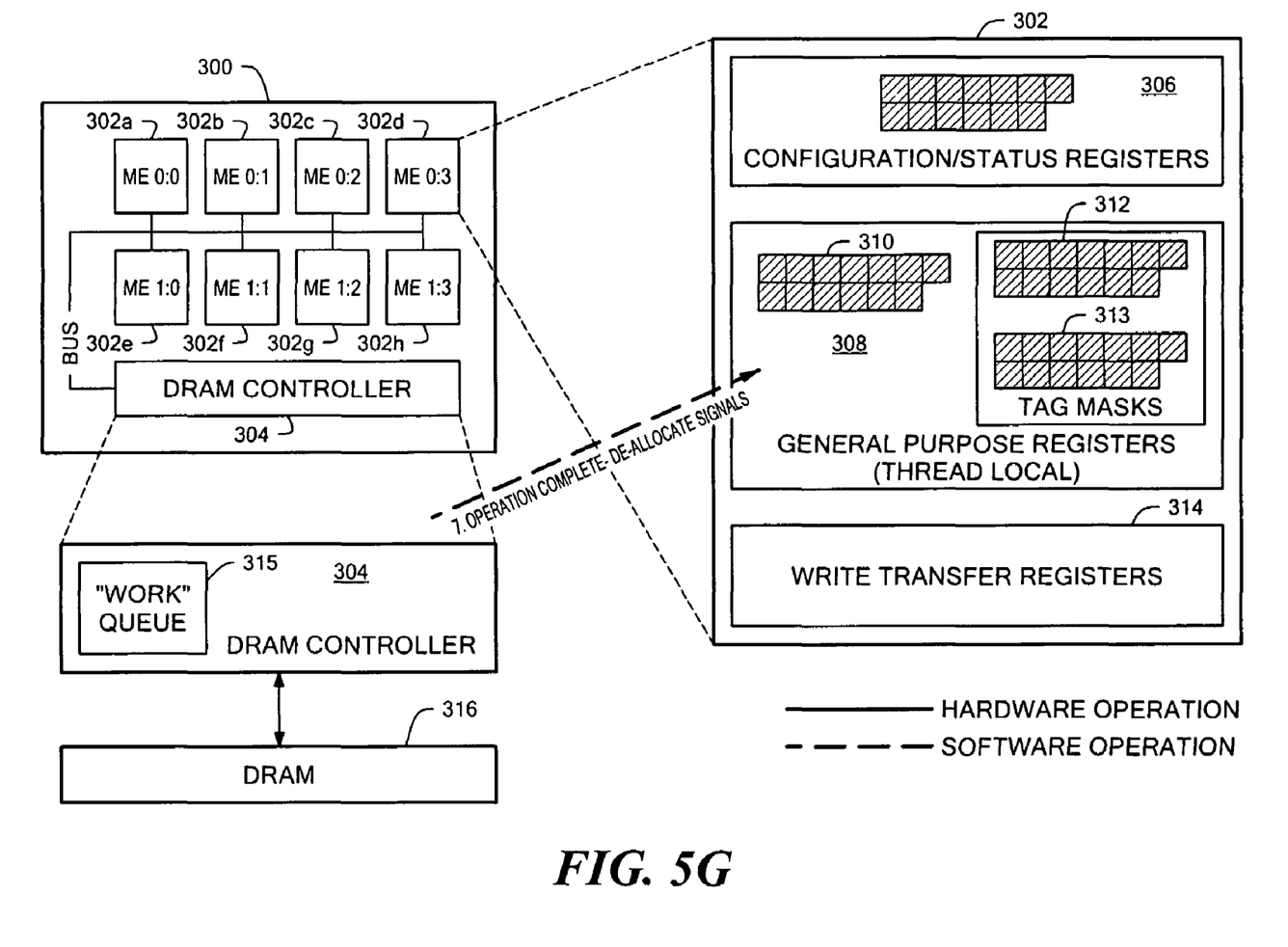

As shown in FIG. 5E, after the DRAM controller 304 has pulled the data from the write transfer register 314, the hardware signals indicating completion of the data transfer are asserted by the DRAM controller to alert the thread that the operation is complete. Assertion of these signals will cause the received signal mask to be updated, e.g., two bits set, as shown FIG. 5F. As described above, the pending signal and received signal masks are then equal indicating completion of the operation. As shown in FIG. 5G, the hardware signal can be de-allocated and the signal busy mask 310 updated to indicate the hardware signal is now available. The pending and received signal masks 312, 313 are also reset.

It is understood that exemplary embodiments show tags as two masks of length, n, where n is the number of hardware signals available to provide allocation of signals in various cases. For example, an Intel IXP network processor DRAM operation could have two 2-bit masks and an integer specifying the first signal for DRAM operations that use exactly two consecutive signals. The n-bit mask can be used for various operations with many possible signaling requirements, but can be tailored for specific needs to save space or simplify program code. It should also be noted that signal virtualization allows I/O operations to be virtualized. Virtual I/O operations may be composed of multiple hardware native I/O operations. For example, for program code that uses signal virtualization, multiple SRAM dequeue operations can be treated as a single virtual operation. This requires four signals that are not necessarily contiguous. Thus, I/O operations native I/O operation as well as virtual I/O operation.

The exemplary embodiments described herein provide dynamic signal allocation and virtualization to allow multiple I/O operations, such as SRAM and DRAM transfers, in microcode to use the same signal number(s) provided that uses of a particular signal are not concurrent. As a result, many more operations are possible per thread of execution than with conventional static signal allocation. Instead of each thread being limited by hardware, such as to fifteen for example, total SRAM operations or seven total DRAM operations, a thread is limited to fifteen concurrent SRAM operations or seven concurrent DRAM operations when sixteen hardware signals are available while the total number of operations is unlimited. This allows microcode to fully utilize transfer registers by allowing more total I/O operations per thread. Microcode that would require hardware support of a greater number of event signals can be used with existing hardware.

While illustrative status, tag, and mask implementations are shown and described in conjunction with specific examples of a network processor and a device incorporating network processors, it is understood that the techniques may be implemented in a variety of storage devices, network processors, and network devices having designs other than those shown. Additionally, the techniques may be used in a wide variety of network devices (e.g., a router, switch, bridge, hub, traffic generator, and so forth). It is further understood that the term circuitry as used herein includes hardwired circuitry, digital circuitry, analog circuitry, programmable circuitry, and so forth. The programmable circuitry may operate on computer programs.

Other embodiments are within the scope of the following claims.

What is claimed is:

1. A method of allocating hardware signals in a multi-core processor, comprising:
   allocating a first hardware signal associated with a first event in a first mask, wherein the first hardware signal corresponds to a bit manipulated by the processor after a request by a first core to a second core external to the first core in the multi-core processor is completed;
   waiting for the first event to complete; and
   de-allocating the first hardware signal and clearing the first mask.

2. The method according to claim 1, further including allocating the first hardware signal and a second hardware signal for the first event.

3. The method according to claim 2, wherein the first processor event includes a DRAM operation.

4. The method according to claim 1, further including allocating the first hardware signal to a second event that is non-concurrent with the first event in a single processing thread.

5. The method according to claim 1, further including allocating a number of hardware signals over a period of time that is greater than a number of hardware signals supported by the processor at any one time provided a number of concurrent allocated hardware signals is less than or equal to the number of hardware signals supported by the processor at the any one time.

6. The method according to claim 1, further including:
   generating a tag for the allocated first hardware signal that comprises:
      a pending signal mask to indicate which hardware signals are pending; and
      a received signal mask to indicate which hardware signals have been received; and
   comparing the pending signal mask and the received signal mask to determine whether the allocated first hardware signal can be de-allocated.

7. The method of claim 6 wherein the pending signal mask includes a bit for each hardware signal in the pending signal mask; and
   wherein the received signal mask includes a bit for each hardware signal in the received signal mask.

8. The method according to claim 1, further including de-allocating the allocated hardware signals when the received signal mask and the pending signal mask are equal.

9. The method according to claim 1, further including creating the first mask in a general purpose register in the processor.

10. A multi-core processor, comprising a memory capable of storing program instructions to enable:
- allocating a first hardware signal associated with a first event in a first mask, wherein the first hardware signal corresponds to a bit manipulated by the processor after a request by a first core to a second core external to the first core in the multi-core processor is completed;
- waiting for the first event to complete;
- de-allocating the first hardware signal and clearing the first mask;
- allocating a number of hardware signals over a period of time that is greater than a number of hardware signals supported by the processor at any one time provided a number of concurrent allocated hardware signals is less than or equal to the number of hardware signals supported by the processor at the any one time.

11. The processor according to claim 10, further including instructions for enabling allocating the first hardware signal and a second hardware signal for the first event.

12. The processor according to claim 10, further including instructions for allocating the first hardware signal to a second event that is non-concurrent with the first event in a single processing thread.

13. The processor according to claim 10, further including instructions for:
- generating a tag for the allocated first hardware signal that includes
  - a pending signal mask to indicate which hardware signals are pending; and
  - a received signal mask to indicate which hardware signals have been received; and
- comparing the pending signal mask and the received signal mask to determine whether the allocated first hardware signal can be de-allocated,
- wherein the pending signal mask includes a bit for each hardware signal in the pending signal mask; and
- wherein the received signal mask includes a bit for each hardware signal in the received signal mask.

14. The processor according to claim 10, further including instructions for de-allocating the allocated hardware signals when the received signal mask and the pending signal mask are equal.

15. An article, comprising:
- a storage medium having, stored thereon instructions that when executed by a machine result in the following:
  - allocating, in a multi-core processor, a first hardware signal associated with a first event in a first mask, wherein the first hardware signal corresponds to a bit manipulated by the processor after a request by a first core to a second core external to the first core in the multi-core processor is completed;
  - waiting for the first event to complete;
  - de-allocating the first hardware signal and clearing the first mask;
  - generating a tag for the allocated first hardware signal that includes
    - a pending signal mask to indicate which hardware signals are pending; and
    - a received signal mask to indicate which hardware signals have been received; and
  - comparing the pending signal mask and the received signal mask to determine whether the allocated first hardware signal can be de-allocated.

16. The article according to claim 15, further including instructions for allocating the first hardware signal and a second hardware signal for the first event.

17. The article according to claim 15, further including instructions for allocating the first hardware signal to a second event that is non-concurrent with the first event in a single processing thread.

18. A network forwarding device, comprising:
- at least one line card to forward data to ports of a switching fabric; the at least one line card including a multi-core network processor having multi-threaded processing elements configured to execute microcode instructions to enable:
  - allocating a first hardware signal associated with a first event in a first mask, wherein the first hardware signal corresponds to a bit manipulated by the processor after a request by a first core to a second core external to the first core in the multi-core processor is completed;
  - waiting for the first event to complete; and
  - de-allocating the first hardware signal and clearing the first mask.

19. The device according to claim 18, further including microcode instructions to enable:
- generating a tag for the allocated first hardware signal that includes
  - a pending signal mask to indicate which hardware signals are pending; and
  - a received signal mask to indicate which hardware signals have been received; and
- comparing the pending signal mask and the received signal mask to determine whether the allocated first hardware signal can be de-allocated.

20. The device according to claim 19, further including microcode instructions to enable:
- allocating a number of hardware signals over a period of time that is greater than a number of hardware signals supported by the processor at any one time provided a number of concurrent allocated hardware signals is less than or equal to the number of hardware signals supported by the processor at the any one time.

* * * * *

UNITED STATES PATENT AND TRADEMARK OFFICE
CERTIFICATE OF CORRECTION

PATENT NO. : 7,549,026 B2  
APPLICATION NO. : 11/094029  
DATED : June 16, 2009  
INVENTOR(S) : Christopher S. M. Hall

Page 1 of 1

It is certified that error appears in the above-identified patent and that said Letters Patent is hereby corrected as shown below:

In column 8, line 53, in Claim 6, delete "signa1s" and insert -- signals --, therefor.

Signed and Sealed this

Twenty-fifth Day of August, 2009

David J. Kappos  
*Director of the United States Patent and Trademark Office*